(12) United States Patent
Karaki

(10) Patent No.: US 7,646,397 B2
(45) Date of Patent: Jan. 12, 2010

(54) ELECTRO-OPTICAL DEVICE, METHOD FOR DISPLAYING AN IMAGE, ELECTRONIC DEVICE, AND DISPLAY STRUCTURE

(75) Inventor: Nobuo Karaki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 697 days.

(21) Appl. No.: 11/186,826

(22) Filed: Jul. 22, 2005

(65) Prior Publication Data

US 2006/0028687 A1 Feb. 9, 2006

(30) Foreign Application Priority Data

Aug. 9, 2004 (JP) .............................. 2004-232119

(51) Int. Cl.
*G09G 5/10* (2006.01)
(52) U.S. Cl. .............................. 345/690; 345/90; 345/92
(58) Field of Classification Search ................. 345/690, 345/90, 92
See application file for complete search history.

(56) References Cited

U.S. PATENT DOCUMENTS

| 5,528,384 | A | * | 6/1996 | Metcalfe et al. ............. 358/447 |
| 5,937,202 | A | * | 8/1999 | Crosetto ....................... 712/19 |
| 6,333,737 | B1 | * | 12/2001 | Nakajima .................... 345/205 |
| 6,336,145 | B2 | * | 1/2002 | Kim ............................ 709/250 |
| 6,915,410 | B2 | * | 7/2005 | Hyduke ........................ 712/17 |
| 2003/0193564 | A1 | * | 10/2003 | Jenkins ........................ 348/182 |

FOREIGN PATENT DOCUMENTS

| JP | A-61-100838 | 5/1986 |
| JP | A 08-307680 | 11/1996 |
| JP | A 09-163141 | 6/1997 |
| JP | A-10-028248 | 1/1998 |
| JP | A-11-126047 | 5/1999 |
| JP | A-2000-324450 | 11/2000 |
| JP | A-2001-092431 | 4/2001 |
| JP | A-2002-049349 | 2/2002 |
| JP | A-2003-069831 | 3/2003 |

* cited by examiner

*Primary Examiner*—Richard Hjerpe
*Assistant Examiner*—Leonid Shapiro
(74) *Attorney, Agent, or Firm*—Oliff & Berridge, PLC

(57) ABSTRACT

What exemplifies the invention is an electro-optical device that includes a matrix of pixel elements, a matrix of pixel drivers, each of which corresponds to each of the pixel elements, and a matrix of element processors, each of which corresponds to each of the pixel drivers. The element processors collaborate in executing grayscale calculation for transforming the grayscale resolution of the pixel data into another grayscale resolution, which is intrinsic in the couple of the pixel element and the driver, with reference to error distributed from the adjacent element processors in order to supply the result of calculation to the corresponding pixel driver, and also in distributing the error of grayscale calculation to the adjacent pixel elements.

10 Claims, 10 Drawing Sheets

ELECTRO-OPTICAL DEVICE, METHOD FOR DISPLAYING AN IMAGE, ELECTRONIC DEVICE, AND DISPLAY STRUCTURE

BACKGROUND

The present invention relates to an electro-optical device, and particularly, to a display technique to provide an image display having a high definition and good color reproduction even on a large-size screen.

Recent flat panel displays provide high-definition and high-quality images even on a large-size screen. Particularly, in the field of plasma displays or liquid crystal displays, fabrication technology for thin film transistor (TFT) devices have been improving in feature size and production yield even with large-size wafer, so that large-size screen displays are installed in various places.

Conventionally, image processing devices that convert grayscale image data into binary image data by using quantization methods such as "error diffusion" and "minimized average error" have been proposed for realizing high-definition and good-color-reproduction images. In the first example of relate art, an image processing device that has a means of fixing problems such as delay effect in generating dot and tailing artifact on the edge of low and high density regions by setting threshold values of quantization in the low and high density regions.

Japanese Unexamined Patent Publication No. 8-307680 (paragraph 0018, etc.) is the first example of related art. Japanese Unexamined Patent Publication No. 9-163141 (paragraph 0047 to 0050, etc.) is the second example of related art.

However conventional display devices can provide high definition and good color reproduction only with proper range of distance and angle of view. Recent demands for installing ultra-large-size displays in various places hint some disadvantages of the conventional.

Firstly, today's typical display devices are designed to provide high-definition and good color-reproduction images assuming that the whole screen is captured inside the sight of viewers with some margins of view angle and distance. However, recently, there can be scenes where viewers closely observe such high-definition and good color-reproduction images. For example, high-definition and good color-reproduction images can be displayed on the wall of a corridor that might force passengers to closely take a look. In such situations, it is quit difficult for the conventional devices to simultaneously provide both ultra wide view and high-definition good-color-reproduction images.

In addition, since definition (resolution) is specific to display device, images that is originally created for target display devices can hardly fit other display devices, which has different definition.

Further, since the larger size display device even with high definition the related arts got to realize, the more the device should weigh and cost, it has been impossible to realize a display that is as huge as a sidewall.

Furthermore, the related arts could not fix the problems inherent in a huge complex-screen display device that is claimed in this application and comprises a plurality of tiles, each of which is a display device manufactured by using low-temperature poly-silicon TFT technology or the like. One of the problems is that the difference in color reproduction between tiles caused by deviation in transistor characteristics can be captured by human vision on the edge of connecting line of tiles.

The first and second references of related arts that are related to enhancing color reproduction by quantization of source image data are mainly dedicated to printing devices and present no specific configurations for display devices.

SUMMARY

Objectives of the invention are to provide both electro-optical devices and methods that can realize high-definition and good-color-reproduction display on a huge screen.

In the first aspect, the invention includes a matrix of pixel elements, a matrix of pixel drivers, each of which corresponds to each of the pixel elements, and a matrix of element processors, each of which corresponds to each of the pixel drivers. The element processor executes grayscale calculation for transforming the grayscale resolution of the pixel data into another grayscale resolution, which is intrinsic in the couple of the pixel element and the driver, with reference to error distributed from the adjacent element processors in order to supply the result of the calculation to the corresponding pixel driver, and also distributes the error of grayscale calculation to the adjacent pixel elements.

In the second aspect, the invention includes a matrix of pixel elements, a matrix of pixel drivers, each of which corresponds to each of the pixel elements, the first matrix of element processors, each of which corresponds to each of the pixel drivers, and the second matrix of element processors, each of which supplies pixel data to the element processor of the first matrix. The element processor of the first matrix executes grayscale calculation for transforming the grayscale resolution of the pixel data into another grayscale resolution, which is intrinsic in the couple of the pixel element and the driver, with reference to error distributed from the adjacent pixel elements so as to supply the result of the calculation to the corresponding pixel driver, and also distributes the error of grayscale calculation to the adjacent pixel elements.

In addition, a method that can realize high-definition and good-color-reproduction display on a huge screen includes input step that feeds pixel data to each of the pixel elements, grayscale calculation step for transforming the grayscale resolution of the pixel data into another grayscale resolution, which is intrinsic in the couple of the pixel element and the driver, with reference to error distributed from the adjacent pixel elements so as to supply the result of the calculation to the corresponding pixel driver, and distribution step that distributes the error of grayscale calculation.

As above-mentioned, the invention includes a matrix of pixel elements, a matrix of pixel drivers each of that corresponds to each of the pixel elements, and a matrix of element processors each of that corresponds to each of the pixel drivers. The element processor executes grayscale calculation for transforming the grayscale resolution of the pixel data into another grayscale resolution, which is intrinsic in the couple of the pixel element and the driver, with reference to error distributed from the adjacent pixel elements so as to supply the result of the calculation to the corresponding pixel driver, and also distributes the error of grayscale calculation to the adjacent pixel elements. Accordingly, an original image is "error-diffused" in an error diffusion algorithm in accordance with the definition (resolution) and the grayscale resolution of the electro-optical device and, as a result, is displayed with high definition and good color reproduction.

For transforming the grayscale resolution, in the aspects of the invention, for example, an error diffusion algorithm such as two-dimensional error diffusion algorithm or a minimized average error method is used. In the two-dimensional error diffusion algorithm, error distributed from a set of adjacent pixel elements and the data originally input for the pixel element sum up into a new pixel data, the grayscale resolution of which is transformed into another gray scale resolution yielding roundup or truncation error that is subsequently distributed to another set of adjacent pixel elements each in a ratio predetermined.

In another aspect, "pixel element" of the invention is referred to as a display element that either emits light or changes state of light from the exterior by means of electric effects so that any specific configurations are not limitedly assumed. For example, the pixel element includes liquid crystal display devices, electroluminescent (EL) devices, plasma emission devices, electrophoretic devices, and electron emission devices in which light is emitted from phosphorescent body that is excited by electron beam accelerated by electric field.

In another aspect, the invention further includes a matrix of element processors in the second layer. Each of the element processors in the second layer is mapped to either one or more element processors in the first-layer matrix. The element processors in the second layer collaborate in transforming the source image data in logical space into the pixel data in physical space. The pixel data in logical space is supplied to the corresponding element processors in the first layer, each of which mapped to corresponding pair of pixel element and pixel driver. Either part or all of a set of algorithm and procedure for the transformation and mapping between the first and the second layers are respectively given to all the element processors of the second layer from the higher or third layer in advance. The set of algorithm and procedure given to the element processors in the second layer includes such that as of interpolation and extrapolation, which is used for converting spatial and chromatic resolution. Operations owned by the higher-layer including the third layer include transformation from vector to raster data and decoding various encoded data input from the outside.

In another aspect, a plurality of layers of a matrix of element processors share operations in logical space resulting in raster images in physical space that is eventually fed to the first layer of a matrix of element processors by the second layer, each element processors of which corresponds or is mapped to each element processors of the first layer that owns the error-diffusion calculations. The number of layers is not limitedly assumed.

For example, the operations in logical space in the higher levels include three-dimensional image processes such as rotating, scaling, shifting, paging through a book and operations in color space such as color inversion. In addition, operations owned by element processors in further higher levels include operations for decompressing compressed image data, transforming vector-image to raster-image data. Image data processed is either raster- or vector-image data and either compressed- or raw-image data.

In the first layer, since element processors on the edge of the matrix have no error distributed across the edge, they use constant values in substitute for the distributed values. Accordingly, a set of algorithm and procedure of error diffusion can be shared by all the element processors no matter where they are located. Just for example, element processors on the uppermost line just use the constant value including zero.

In another aspect of this invention, the element processor is preferably implemented as an asynchronous microprocessor that is connected to the adjacent element processors by using a handshaking protocol. In terms of affinity between the set of algorithm of error diffusion and the event-driven fashion of asynchronous circuits, a matrix of asynchronous element processors collaborate communicating with each other for effectively passing the error. All the actions of handshaking between asynchronous element processors are blocking so that element processors suspend calculation until all the distributed data arrive. Moreover, the asynchronous element processors consume extremely low power with no clocking while operating in even-driven fashion at maximum speed uniquely determined by element and wire delay. As a result, ultimate power saving and high speed displaying can be achieved with a large-size screen display device.

In another aspect of this invention, each element processor is configured to evaluate complex expressions written in reverse polish notation (RPN). Since binary size of a program written in Forth that effectively handles complex expressions written in RPN can be smaller than that of program written in other computer languages, architecture dedicated to Forth language is preferably implemented in the element processors with optimal depth of stack memory.

In another aspect of the invention, the element processor is configured so that pixel data in physical space, where each of element processors is mapped one by one to a pair of pixel element and its driver, is generated exactly on grid by using algorithm of either interpolation or extrapolation from both spatial and chromatic data of pixel in logical space. By the means, high-definition display devices can display smooth and natural images of pictures, the original resolution of which is much poorer.

In another aspect, the display device is equipped with a color measurement system that consists of a color measuring means and a control circuit for feeding back error in color space to the element processors. The element processors execute calculation of compensation so that the error in color space on the border of tiles, which surface is made of a matrix of pixel elements, can be minimized leading to negligible error in color space on the border. Furthermore, a transferring means for transferring the color measuring means along the border of tiles made of a matrix of pixel elements might be included.

According to the configuration, even in case differences in color between pixels caused by deviations in characteristics of pixel elements and the drivers originally exist, the grayscale calculation performed by using the information fed back offline or in advance from the color measuring means yields negligible difference in color on the actual display.

In another aspect of the invention, the embodiment is both an electronic device that is equipped with the electro-optical device as a display and a display structure featuring the electro-optical device.

Here, "electronic device" is referred to as a general device that demonstrates a given function by combining a plurality of elements or circuits. For example, it is constructed by including an electro-optical device and a memory. Since the construction is not limitedly proposed, television devices including the electro-optical device, roll-up television devices, personal computers, cellular phones, video cameras, head mount displays, rear or front projectors, fax-machines with display functions, finders in digital cameras, portable TVs, DSP devices, PDAs, electronic-notebooks, electric sign boards, IC cards, advertising displays, etc. are exemplified.

In another aspect of this invention, "display structure" is of a concept beyond portable devices and includes walls, floors and ceilings of constructions such as mobile objects including automobiles, trains and airplanes, and architectural structures. Pixel elements made of semiconductor devices are embedded on the walls, floors and ceilings of the constructions. Image data can be fed through a plurality of layers of a matrix of element processors.

BRIEF DESCRIPTION OF THE DRAWINGS

The invention will be described with reference to the accompanying drawings, wherein like numbers refer to like elements, and wherein.

DETAILED DESCRIPTION OF EMBODIMENTS

Embodiments of the invention will now be described with reference to the accompanying drawings. The embodiments of the invention described below merely exemplify application of the invention. The invention is not limited to the following embodiments, but can be applied with various modifications.

First Embodiment

Figure 1:
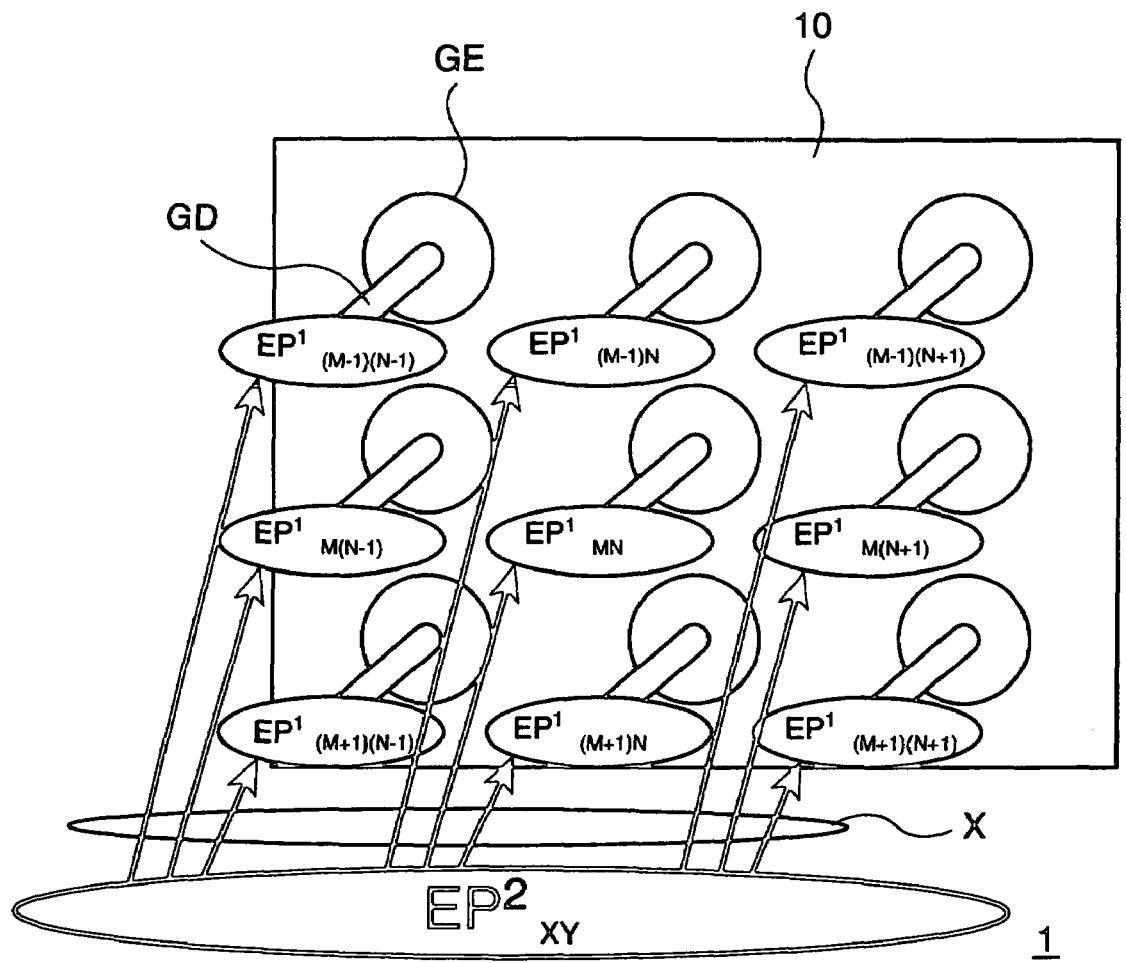
FIG. 1 is a basic configuration diagram of an electro-optical device according to a first embodiment of the invention.

An electro-optical device according to a first embodiment of the invention will be described with reference to FIG. 1 and FIG. 2. FIG. 1 schematically illustrates a connection relation in an electro-optical device according to the first embodiment of the invention. As shown in FIG. 1, an electro-optical device 1 of the first embodiment is configured by including a plurality of pixel elements GE displaying a pixel, a pixel driver GD corresponding to each of the plurality of pixel elements GE, and a first element processor EP1 corresponding to each pixel driver GD. For example, a first element processor $EP1_{MN}$ located at M row, N column drive a pixel driver GD at M row, N column to supply pixel data for displaying a pixel on a pixel element DE at M row, N column.

In addition, a second element processor EP2 serving as a higher-layer supplies multiple grayscale pixel data X (m bits) to each first element processor EP1. Specifically, the second element processor EP2 corresponds respectively to each first element processor EP1 included in a matrix that is 3 rows×3 columns in size so as to supply pixel data X to each first element processor EP1.

Moreover, the second element processor EP2 can supply necessary control information for an error diffusion calculation to each first element processor EP1 in a lump sum. The control information is, for example, configured so that the following items can be supplied: a relative arrangement of element processors to which error data is distributed; a distribution rate W that is a weighting coefficient for a quantization error D determined for each distribution; a threshold value yth for quantizing; configuration information of a pixel driver GD and a pixel element GE; and γ correction information that is applied if needed. The information is supplied successively after transmitting pixel data X in a predetermined sequence. In a case where an image is displayed at a predetermined timing in a lump sum, its synchronous information is also supplied.

The first element processor EP1 executes an error diffusion calculation by inputting the multiple grayscale pixel data X and the control information. The first element processor EP1 is configured so as to change the number of grayscales of the pixel data X supplied for a specific pixel element GE to a different number by referring error data for a pixel element GE adjacent to the specific pixel element GE and then output error data generated by the calculation to another pixel element GE adjacent to the specific pixel element GE.

With the configuration, each first element processor EP1 executes an error diffusion calculation for multiple grayscale pixel data X supplied from the second element processor EP2 so as to generate pixel data Y having the reduced number of grayscales for a specific pixel element. The pixel data Y is supplied to one pixel element GE through one pixel driver GD so as to display an image having improved definition and color reproducibility.

For displaying colors, the first element processor EP1, the pixel driver GD connected to the processor EP1, and pixel element GE connected to the driver GD are provided in accordance with primary colors. This makes it possible to display any color by a group of pixel elements corresponding to a plurality of primary colors included in a color pixel. One of the aims of the invention is to improve color reproducibility. Since an error diffusion process is performed in a similar fashion for each primary color, in the following descriptions, only a configuration corresponding to a single color configuration will be described for simple description.

Here, the configuration of the element processor EP, the pixel driver GD, and the pixel element GE is not limited, but known techniques can be diversely used. For example, the first element processor EP1 has a configuration of a small microcomputer as a typical computer device. The first element processor EP1 is required to be configured so that it can communicate with at least an adjacent first element processor EP1, and execute a specific error diffusion calculation shown in the embodiment. Particularly, the first element processor EP1 is preferably configured with an asynchronous circuit shown in a second embodiment of the invention.

Each of the pixel drivers GD, which is a thin film semiconductor device (e.g. thin film transistor (TFT)), etc. formed on a substrate, is constructed so that a current (power) corresponding to a grayscale of given pixel data can be supplied to the pixel element GE with its output terminal connected to the pixel element GE.

Examples of the pixel element GE include liquid crystal display devices, plasma emission device, EL devices. In addition to these, ones equipped with electrophoretic devices and electron emission devices are also included. The pixel element GE is configured so that it can emit or transmit or reflect light based on a density corresponding to grayscale of given pixel data. The first element processor, the pixel driver, etc., are composed of a thin film semiconductor device (TFT) formed on a substrate. It is particularly preferred that they are composed of low temperature poly silicon (LTPS) or high temperature poly silicon (HTPS) or amorphous silicon. An organic TFT also can be used. The organic TFT can be manufactured by a droplet discharge method that can manufacture fine ones having high performance.

Figure 3A:
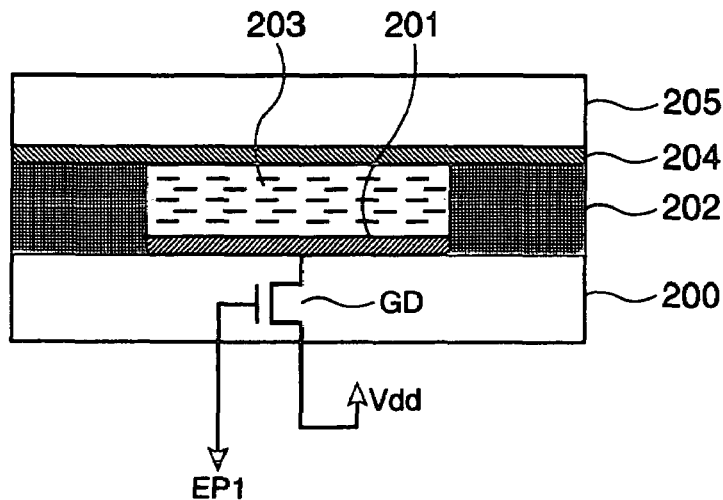
FIG. 3A is an enlarged sectional view illustrating a vicinity of a pixel element of a liquid crystal display device as a configuration example of a pixel element GE.

FIG. 3A is a sectional view illustrating a liquid crystal display device as an example of the pixel element GE. FIG. 3A illustrates only one pixel. The liquid crystal display device includes an individual electrode 201 formed on a glass substrate 200 with a transparent electrode material such as ITO, etc., and a liquid crystal material 203 filled in a space partitioned by a spacer 202. A common electrode 204 made of a transparent electrode material is provided to the liquid crystal material 203. A protection film 205 is formed on the common electrode 204. Each surface of the individual electrode 201 and the common electrode 204 is subjected to rubbing treatment for aligning liquid crystal molecules in the liquid crystal material 203. The pixel driver GD of the invention, which is formed with, for example, a thin film semiconductor device, is configured so as to be able to apply a predetermined voltage to the individual electrode 201. According to the above-mentioned configuration, in the liquid crystal display device, a voltage supplied from the first element processor EP1 in accordance with pixel data Y is applied to the individual electrode 201 so as to reflect or transmit light of an amount corresponding to a density of the pixel data Y.

Figure 3B:
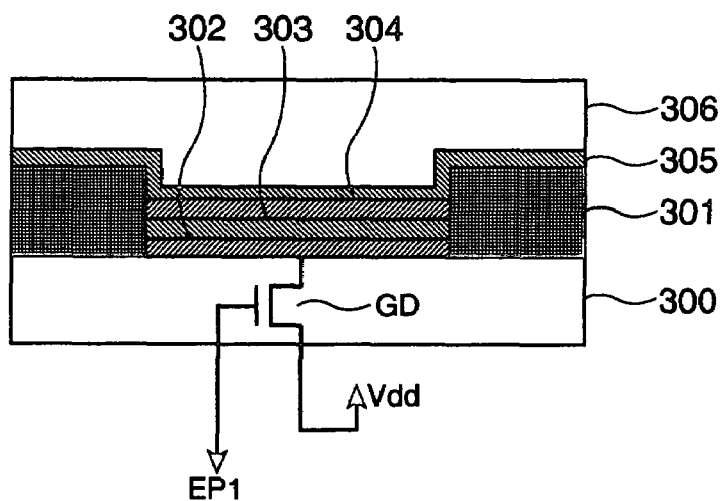
FIG. 3B is an enlarged sectional view illustrating a vicinity of a pixel element of an EL device as another configuration example of the pixel element GE.

FIG. 3B is a sectional view illustrating an EL display device as another example of the pixel element GE. In the EL device, a bank 301 serving as a partition is formed on a transparent substrate 300. In an opening part due to the bank 301, an individual electrode 302, a hole transfer layer 303, and a luminescent layer 304 are formed with a transparent material. A common electrode 305 is provided so as to cover a plurality of pixels. In the above-mentioned configuration, upon applying a voltage corresponding to the pixel data Y from the first element processor EP1, electrons from the common electrode 305 serving as a cathode and holes from the individual electrode 302 serving as an anode are respectively injected. When electrons and holes are coupled in the luminescent layer 304, molecules in the EL material are excited to emit light. The luminescent amount corresponds to an amount of current applied to the individual electrode 302. As a result, light of an amount corresponding to a density of the pixel data Y is emitted.

Figure 2:
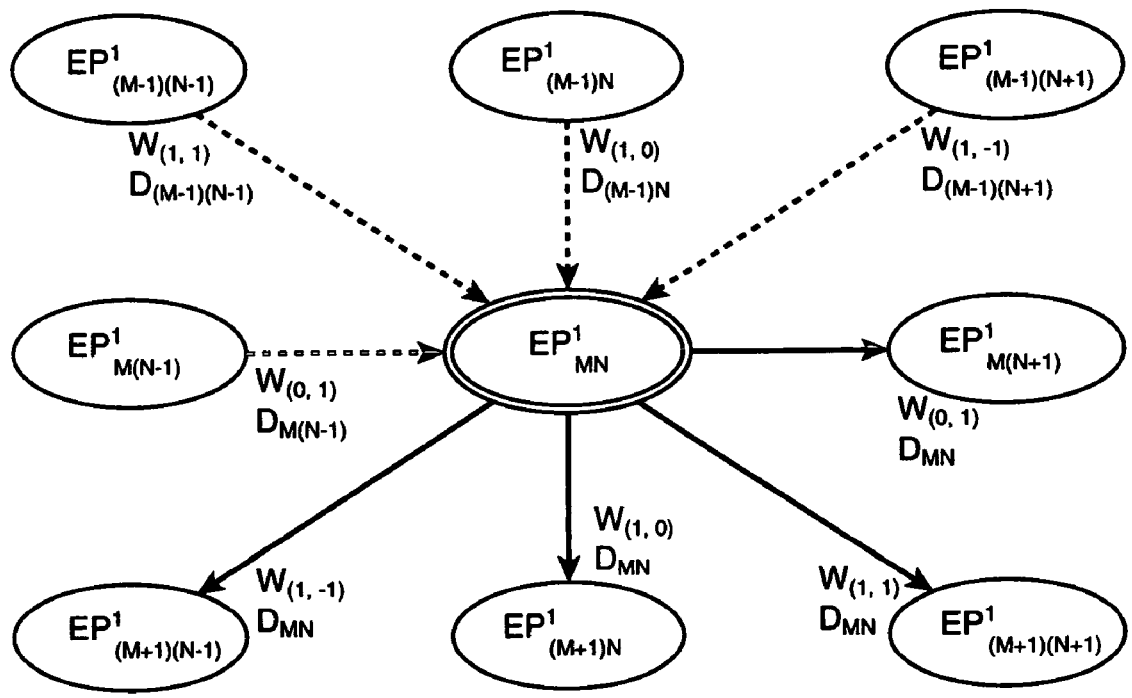
FIG. 2 is a diagram illustrating an input-output relation in a two-dimensional error diffusion calculation in a first element processor.

As shown in FIG. 2, each first element processor EP1 is connected to adjacent first element processors via at least 9 channels. FIG. 2 illustrates an input-output relation of the first element processor $EP1_{MN}$ at M row, N column.

Specifically, as shown in FIG. 2, the first element processor $EP1_{MN}$ inputs error data $W_{(1,1)} \cdot D_{(M-1)(N+1)}$, $W_{(1,0)} \cdot D_{(M-1)N}$, $W_{(1,-1)} \cdot D_{(M-1)(N+1)}$, and $W_{(0,1)} \cdot D_{M(N-1)}$ that are weighted quantized error from adjacent first element processors $EP1_{(M-1)(N-1)}$, $EP1_{(M-1)N}$, $EP1_{(M-1)(N+1)}$, and $EP1_{M(N-1)}$ as error data. The first element processor $EP1_{MN}$ quantizes own pixel data $X_{MN}$ to generate image data $Y_{MN}$. Then, the first element processor $EP1_{MN}$ distributes error data $W_{(1,-1)} \cdot D_{MN}$, $W_{(1,0)} \cdot D_{MN}$, $W_{(1,1)} \cdot D_{MN}$, and $W_{(0,1)} \cdot D_{MN}$ that are obtained by weighting quantized error $D_{MN}$ generated in the quantization to adjacent first element processors $EP1_{(M+1)(N-1)}$, $EP1_{(M+1)N}$, $EP1_{(M+1)(N-1)}$, and $EP1_{(M+1)(N-1)}$ respectively.

As above-mentioned, one first element processor inputs error data distributed from 4 adjacent first element processors EP1, and also outputs error data calculated as a result of an error diffusion calculation to 4 adjacent first element processors EP1. Upon focusing attention to a piece of error data, the data is communicated only between 2 first element processors EP1. Thus, in the first element processor controlling inputting and outputting the data, the characteristics of its port is unambiguously determined by the characteristics of the port on the other end of communication. That is, if a port of sender is an active input port, a port of receiver should be a passive output port. If a port of sender is an active output port, a port of receiver should be a passive input port.

Figure 4:
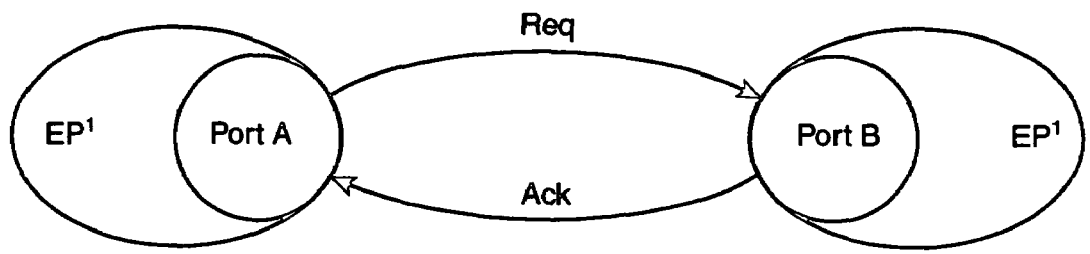
FIG. 4 is a diagram illustrating communication between ports of an element processor.

FIG. 4 illustrates a port connection diagram between the first element processors. The first element processor EP1 of the embodiment is configured so that an active input port A and a passive output port B are connected to permit communication with a request signal Req and an acknowledged signal Ack so as to mutually communicate by handshaking operation. The ports are connected so as to be able to interchange the request signal Req and the acknowledged signal Ack. In a case where a lot of data is sent, data read timing can be controlled by supplying a read clock.

Figure 5A:
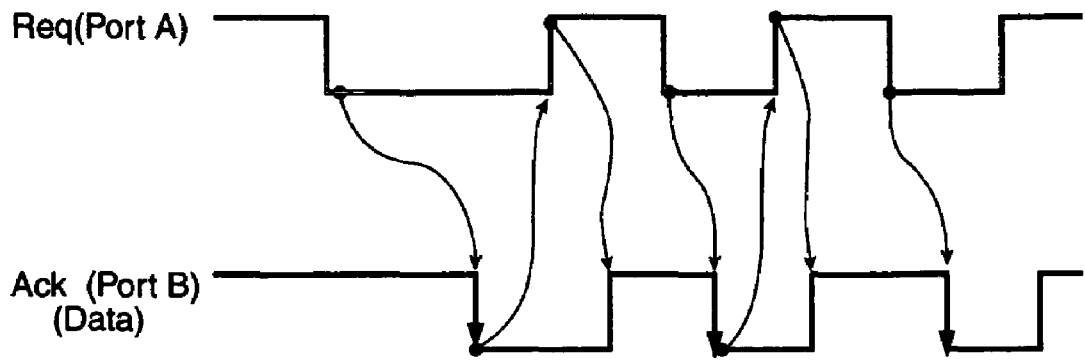
FIG. 5A is a timing chart in a case where an active input and a passive input are connected.

FIG. 5A is a timing chart illustrating a case where an active input port A and a passive output port B are connected. As shown in FIG. 5A, when communication starts between the first element processors EP1, the active input port A asserts the request signal Req (e.g. H level). In the port B, after receiving the request signal Req in active, once a condition in which data can be output, e.g., internal calculation results are ready, etc., is made, the data is sent as the acknowledged signal Ack. The data may be encoded. For example, in the first embodiment, data encoded by a dual-rail encoder is sent. The data sending as the acknowledged signal Ack causes the port A to recognize that the data has sent to the port A.

Figure 5B:
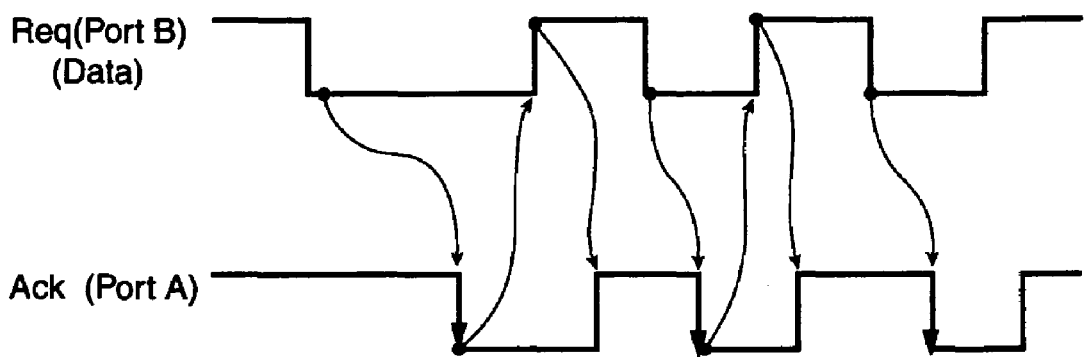
FIG. 5B is a timing chart in a case where a passive input and an active input are connected.

FIG. 5A is a timing chart illustrating a case where a passive input port A and an active output port B are connected. In a case where the port A is a passive port and the port B is an active port as shown in FIG. 5B, the port B firstly sends data as the request signal Req upon completion of preparing data, whereas the port A sends the acknowledged signal Ack at the same time as receiving the data.

Such handshaking operation can reliably transmit and receive data in accordance with mutual conditions with simple procedures. Thus, the handshaking operation is preferable for a configuration of communication ports for the first element processor EP1 of the embodiment that is required to simplify each circuit configuration since a lot of one-on-one communication routes are included.

Next, procedures of two-dimensional error diffusion calculation executed in the first element processor EP1 by the above-mentioned handshaking communication will be specifically described. In the embodiment, an order of error calculation is programmed so that the error calculation is executed from the uppermost row to the lowermost row, and from the leftmost pixel element to rightmost pixel element in a target region. When reaching to the rightmost pixel element of a row, the calculation is continuously executed from the leftmost pixel element of a row that is one row lower than the previous round. The order of calculation can be arbitrarily changed. Below, a two-dimensional error diffusion calculation for converting 256 grayscales (8 bits) to 8 grayscales (3 bits) will be described by focusing attention to pixel data of 8 bits, i.e. one primary color among color image data actually composed of 24 bits, for simple description.

(1) First, with respect to a pixel element to which an calculation is executed, for example, a pixel element $GE_{MN}$ at M row, N column, the first element processor EP1 quantizes pixel data $X_{MN}$ supplied from the second element processor EP2 so as to generate pixel data $Y_{MN}$. Then, the first element processor EP1 calculates quantized error $D_{MN}$ of the pixel element $GE_{MN}$. The order of the calcuration starts from a pixel element at upper left of a calulation target region, i.e. 1 row, 1 column of the calculation target region. A quantized function $Q_{83}$ is used for quantized calculation.

$$Q_{83}: X_{MN} \to Y_{MN}$$

Here, the first element processor EP1 is programmed so that it quantizes all pixel elements using the quantized function $Q_{83}$ with the following algorithm.

i) The quantized function $Q^{83}$ is defined with $(2^3-1)$, i.e. 7 threshold values. The n-th threshold value $yth_n$ of them is defined as an integer that satisfies the formula 1.

$$((n-1) \cdot 255/7) \leq yth_n \leq (n \cdot 255/7) \qquad \text{formula 1}$$

For example, in a case where the intermediate value in a range of the formula 1 is employed as the threshold value, the threshold value $yth_n$ is represented by the formula 2.

$$yth_n = (2n-1) \cdot 255/14 \qquad \text{formula 2}$$

Seven threshold values are obtained as the formula 3 by changing n from 1 to 7.

$$(yth_1, yth_2, yth_3, yth_4, yth_5, yth_6, yth_7) = (18, 55, 91, 128, 164, 200, 237) \qquad \text{formula 3}$$

ii) Next, the first element processor EP1 compares a summation of the pixel data $X_{MN}$ supplied to the pixel element $GE_{MN}$ and error data supplied to the pixel element with the threshold value so as to determine n that satisfies the formula 4. For example, in a case where the pixel element is at the upper left of the target region, error data from adjacent pixel elements is zero.

$$yth_n < X_{MN}(+ \text{a summation of error data}) < yth_{n+1}$$

where $0 < n < 7$, $yth_0 = 0$, $yth_8 = 255$

Then, the n-th value of a 3-bit vector (000, 001, 010, 011, 100, 101, 110, 111) is output as pixel data $Y_{MN}$ having a changed grayscales of 8 grayscales (3 bits).

iii) Next, the first element processor EP1 obtains a quantized error D. The value after normalizing the value of the n-th element of the 3-bit vector (000, 001, 010, 011, 100, 101, 110, 111) to 8-bit value is obtained by $n \cdot 255/7$. The normalized vector is represented by the formula 5.

$$(0, 36, 72, 109, 145, 182, 218, 255) \qquad \text{formula 5}$$

The value obtained by subtracting the n-th value of the formula 5 from the pixel data $X_{MN}$ serving as input value is the quantized error $D_{MN}$ of the pixel element $GE_{MN}$.

(2) Next, the first element processor EP1 executes a calculation for distributing the obtained quantized error $D_{MN}$ to each pixel element located at lower left, under, lower right, and right side with respect to the pixel element $GE_{MN}$ at predetermined distribution rates $W_{(1,-1)}$, $W_{(1,0)}$, $W_{(1,1)}$, and $W_{(0,1)}$. In a case where corresponding pixel element is not present, the calculation is executed by substituting a fixed value for the distribution rate. Here it is zero. For example, a quantized error $D_{11}$ of a pixel element $GE_{11}$ is distributed to each pixel element with respective distribution rate as follows: a pixel element at lower left (2 row, 0 column) with a distribution rate of zero; a pixel element at just under (2 row, 1 column) with a distribution rate of $W_{(1,0)}$; a pixel element at lower right (2 row, 2 column) with a distribution rate of $W_{(1,1)}$; and a pixel element at right side (1 raw, 2 column) with a distribution rate of $W_{(0,1)}$. Here, distribution rate is represented by the formula 6.

$$(0, W_{(1,0)}, W_{(1,1)}, W_{(0,1)}) \qquad \text{formula 6}$$

In this way, the error diffusion calculation of one pixel element is completed. In a case where corresponding pixel element is not present, a fixed value other than zero may be substituted.

(3) In a similar fashion, the first element processor EP1 changes the calculation target to the next pixel element located at right side to execute the calculation described in (1) and (2) again. As above-mentioned, the threshold value yth can be compared by substituting zero for error data in the formula 4 with respect to the pixel element at the upper leftmost of the target region. In contrast, from the next pixel element at the right side, since the error data from the pixel element to which the calculation has been executed is present, the threshold value is compared with the value in which the error data is added in the formula 4. For example, in the calculation for a pixel element $GE_{12}$, a comparison is represented by the formula 7 by adding error data in which a quantized error $D_{11}$ with respect to the pixel element $GE_{11}$ is weighted.

$$yth_n < X_{12} + W_{(0,1)} \cdot D_{11} < yth_{n+1} \qquad \text{formula 7}$$

Subsequently, the error data calculation described in (2) is executed so as to distribute new quantized error $D_{12}$ with distrubution rates given by the formula 6. The first element processor repeats such error diffusion calculation in the above-mentioned operation order.

(4) In a case where error diffusion calculation is executed with respect to a pixel element at the right end, pixel elements at lower right and right side with respect to the pixel element are not present. Thus, the distribution rates represented in the formula 8 are used. Distribution rates $$(W_{(1,-1)}, W_{(1,0)}, 0, 0) \qquad \text{formula 8}$$

(5) In the error diffusion calculation starting from the second row, error data from a pixel element at row that is one row higher than the row to be executed and a pixel element at left side is present. Therefore, the first element processor EP1 performs a threshold comparison based on the general formula 9 with respect to, for example, the pixel element $GE_{MN}$ at M row, N column.

$$yth_n < X_{MN} + W_{(1,1)} \cdot D_{(M-1)(N-1)} + W_{(1,0)} \cdot D_{(M-1)N} + W_{(1,-1)} \cdot D_{(M-1)(N+1)} + W_{(0,1)} \cdot D_{M(N-1)} < yth_{n+1} \qquad \text{formula 9}$$

(6) As for a pixel element at the leftmost and a pixel element at the rightmost of the lowest raw in the target region, error data is not supplied from adjacent regions. Thus, corresponding distribution rates in formula 9 are zero. As a result, in a case of the leftmost is represented by the formula 10 while in a case of the rightmost is represented by the formula 11.

$$yth_n < X_{MN} + W_{(1,0)} \cdot D_{(M-1)N} + W_{(1,-1)} \cdot D_{(M-1)(N+1)} < yth_{n+1} \qquad \text{formula 10}$$

$$yth_n < X_{MN} + W_{(1,1)} \cdot D_{(M-1)(N-1)} + W_{(1,0)} \cdot D_{(M-1)N} + W_{(0,1)} \cdot D_{M(N-1)} < yth_{n+1} \qquad \text{formula 11}$$

Figure 6:
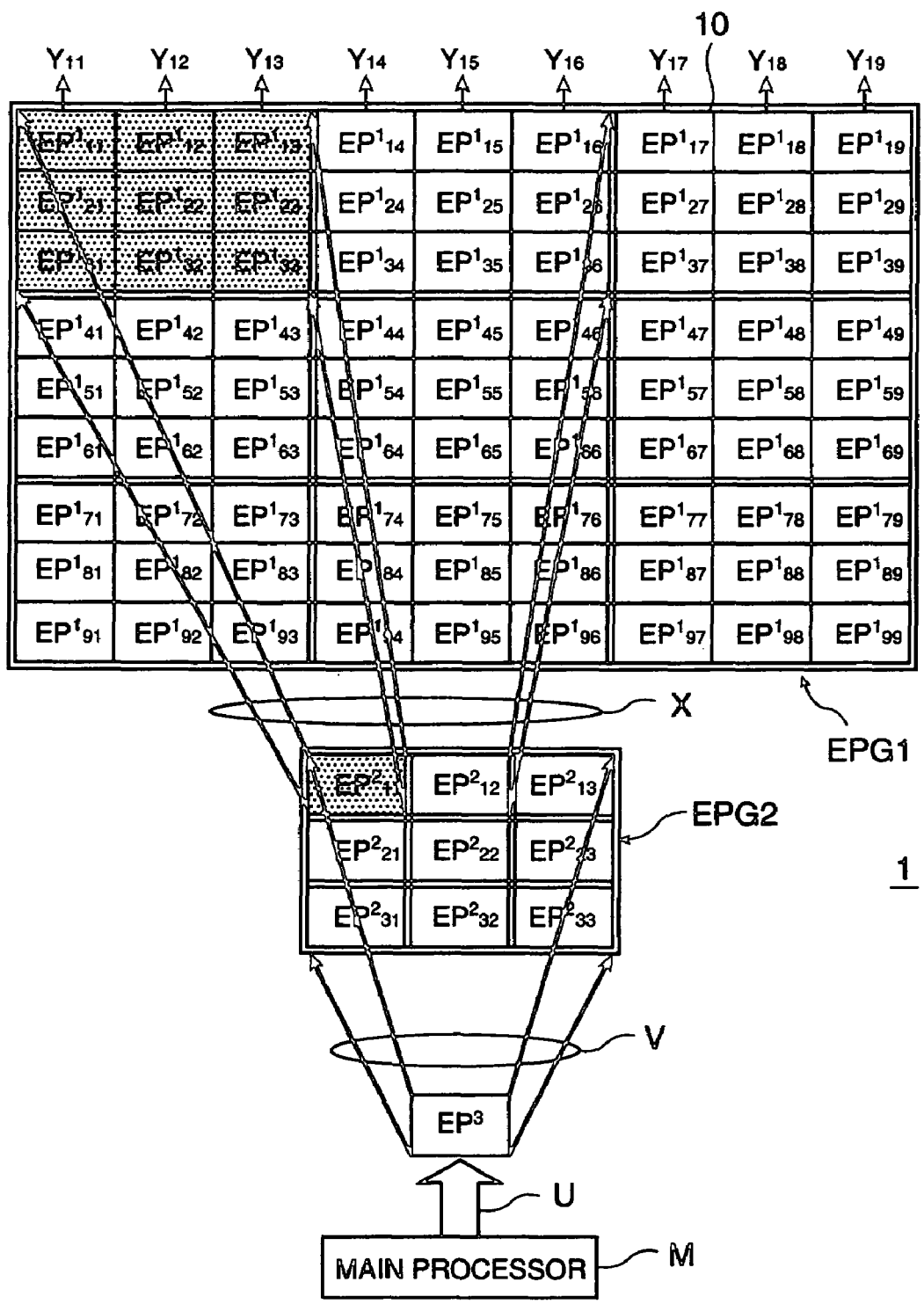
FIG. 6 is a whole configuration diagram of an electro-optical device according to the first embodiment of the invention.

FIG. 6 illustrates the whole configuration of an electro-optical device 1 embodied in the first embodiment. In the electro-optical device 1, element processors are provided in three layers and mutually connected. That is, a first element processor group EPG1, a second element processor group EPG2, and a third element processor EP3 are provided in this order from the lowest layer. The third element processor EP3 inputs image data U from a main processor M.

In the first element processor group EPG1 located at the lowest layer, the pixel element GE is provided in a matrix of 9 rows×9 columns. Eighty one element processors EP1 in the first element processor group EPG1 are divided into 9 regions each of which is adjacent each other and composed of 9 first element processors arranged in a matrix of 3 rows×3 columns.

Each of second element processors EP2 included in the second element processor group EPG2 supplies image data to each of 9 regions of the first element processor group EPG1. In addition, the third element processor EP3 in the top layer supplies image data to each of the second element processors EP2 in the second element processor group EPG2.

As for a boundary between the regions in the first element processor group EPG1, for example, between $EP1_{13}$ and $EP1_{14}$, and $EP1_{23}$ and $EP1_{24}$, a borderline is present. However, communication channels are provided between them so that error data for these pairs of element processors is supplied beyond the borderline to disperse the error without discontinuity.

In the embodiment, the third element processor EP3 decodes encoded original image data U so as to output the decoded image data V. Other than decoding, a process can be performed in which raster data is generated from vector data. The second element processor group EPG2 executes a calculation process of the decoded image data V. That is, predetermined processes in logical pixel space such as a three-dimensional process including rotating, scaling, tuning pages, etc., and a color conversion process including color reversing, etc., are performed. Then, each pixel data X is output that has a fixed position (address) in physical pixel space as a raster image. The first element processor group EPG1 out puts pixel data Y having a reduced grayscale. The pixel data Y is obtained by subjecting each pixel data X to a quatization process (error diffusion) for error diffusion. The pixel driver GD drives the display element GE with current (power) of an amount corresponding to the pixel data Y so as to display a pixel in accordance with a density of the pixel data Y. Element processors (group) of each layer should include a configuration enough to perform the image processing assigned to each layer. As an example, the third element processor EP3 can supply image data V of pixel base to the second element processor EP2. The processor EP3 includes co-processors, frame memories, memories such as RAM, etc., FIFO memories adjusting a time axis, etc. that are enough to decode compressed image data U. The second element processor EP2 includes co-processors, frame memories, memories such as RAM, etc., FIFO memories, etc., for executing a coordinate conversion process In the above-mentioned configuration, firstly, the main processor M supplies original image data U. The original image data U is compressed encoded image data in accordance with a predetermined motion picture compression standard. Here, the standard is JPEG. In a case where the third element processor EP3 executes a process to generate raster data from vector data, the original image data U is supplied with vector information.

The third element processor EP3 inputs the original image data U to execute an interpolation process of a frame image based on known decoding techniques. As a result, restored image data V is generated so as to be output to the second element processor group EPG2. Decoding of motion pictures such as JPEG or MPEG performs an interpolation in time space. The interpolation is performed at a fixed number of frames so as to restore omitted frame images.

The second element processor group EPG2 executes a predetermined calculation process, for example, a rotation process of an image in logical image space, to the decoded image data V. As an example, the second element processor group EPG2 performs as follows: firstly, the image data V is stored in a memory; a matrix calculation in logical pixel space is performed to the image data V for operation process such as rotating, etc.; and an address in physical pixel space is fixed so as to store the data into a frame memory as image data W. Then, each second element processor EP2 partially reads the image data W in accordance with an address of image data W stored in the frame memory. The data is output to each region of the first element processor group EPG1 as pixel data X for an error diffusion calculation.

In each region of the first element processor group EPG1, as described in the above-mentioned principle, processes are performed as follows: a two-dimensional error diffusion calculation is executed based on the image data X supplied from each second element processor EP2; the grayscale of the image data X is quantized to image data Y having a grayscale suitable for displaying on a pixel element GE; and an image is displayed on corresponding pixel element GE.

Here, in the embodiment, error distribution is directed to four directions with respect to each pixel element, i.e. lower left, under, lower right, and right side. Thus, the distribution is carried out by the following sequence: $EP1_{11} \rightarrow EP1_{12} \rightarrow \ldots \rightarrow EP1_{19}$; $EP1_{21} \rightarrow EP1_{22} \rightarrow \ldots \rightarrow EP1_{29} \ldots$ ; and $EP1_{91} \rightarrow EP1_{92} \rightarrow \ldots \rightarrow EP1_{99}$. Consequently, unless a synchronous process is executed in the second element processor group EPG2, the error diffusion calculation is executed in this order. As a result, display element data is ready in this order so as to display a pixel. In the embodiment, a synchronous process is required since processes in the third element processor EP3 or second element processor EP2 are performed using frame images. However, error diffusion process in the first element processor group EPG1 may be performed so that a display is carried out in the order of the completion of the calculation, even though the synchronous process can be performed for the first element processor group EPG1.

In the second element processors EP2, images are subjected to predetermined calculation process. However, an address obtained by a calculation in logical pixel space is often not present at an address in physical pixel space given by a memory, i.e. not located on a grid of a pixel matrix. For example, a number of pixels are in such off-grid state in a rotation process or enlargement process, etc. Also, in a case where an image from another image source having a different definition (resolution) is displayed on a predetermined area of a display surface 10, a straight line, etc., is often displayed as a serrated line.

In order to compensate these disadvantages, in the embodiment, the second element processor EP2 or first element processor EP1 may be configured so as to include interpolation data generation means or extrapolation data generation means. The means can be configured by a high-speed calculation circuit such as DSP or a software process with software programs.

For example, in the interpolation data generation means, in a case where an address in logical pixel space obtained by a result of a calculation process is out of a grid given in physical pixel space, a grayscale of pixel data of a nearest grid to the address is estimated so as to generate the pixel data for the nearest grid. In addition, in a case where a distance between addresses of adjacent two pixels obtained as a result of a calculation process is over a predetermined distance, pixel data is generated with a predetermined grayscale on a grid between the addresses so as to display a smooth image. As for the interpolation, methods generally used in image processing can be used as follows: a nearest neighbor method; a bi-linear method by which an interpolation is linearly performed in a longitudinal and lateral direction; and a cubic convolution method by which an interpolation is performed in a longitudinal and lateral direction using a cubic formula of an approximation formula of SINC function, etc.

In contrast, in the extrapolation data generation means, an address of the end point in physical pixel space is generated by a known extrapolation method so as to display images without visual inconsistency. In a case where images are rotated or images based on image data corresponding to another definition are displayed in the display 10, this process allows images to be displayed with smooth lines without visual inconsistency.

As above-mentioned, the first embodiment demonstrates the following effects.

1) First, according to the embodiment, image display having high definition and good color reproducibility can be achieved even in a case where a large-sized screen display should be observed from an extremely close position to its image display surface, since the first element processor executes an error diffusion calculation. Also, image sources having any resolutions can be changed to a suitable grayscale that the pixel drivers can display.

2) In addition, according to the embodiment, images corresponding to different image sources can be displayed with high definition and good color reproducibility without visual inconsistency even in a case where images that are originally produced for displaying in a different definition and supplied from another image source are displayed on the image display, since the first element processor EP1 performs a quantization by a error diffusion calculation based on the image source.

3) In addition, according to the embodiment, an electro-optical device having low weight, low cost, and high yield can be achieved even though its image display surface is large in size, since the device, which includes the first element processor, can be composed of a thin film semiconductor device.

4) Moreover, the embodiment has the following advantages. The matrix composed of the element processor is provided in layers so that each process load can be dispersed to each layer. This allows the element processors in each layer to be limited on relatively simple processes even in a case where complicated processes with several steps are required from an original image. As a result, the device can be composed of such as a thin film semiconductor device. Also, the layers are configured so that individual process different from each other is performed in each layer. This allows contents of the process in each layer to be defined and designed individually. As a result, design processes can be simplified.

5) Further, according to the embodiment, even in a case where a variation in manufacturing causes changes in characteristics of thin film semiconductor devices, the variation can be visually undistinguished since a density change between adjacent pixel elements is smoothed by an error diffusion calculation. Furthermore, according to the embodiment, communication between the first element processors is performed by a handshaking protocol. This allows a circuit configuration of a port to be simplified. As a result, first element processors can be composed of a thin film semiconductor device. Consequently, the first element processor can be achieved that is in compact size with low cost and low power consumption.

Second Embodiment

A second embodiment of the invention relates to a configuration of each element processor. An electro-optical device according to the second embodiment basically includes the same configuration as that of the first embodiment. The first element processor EP1 is configured with an asynchronous circuit including an asynchronous CPU.

Figure 7:
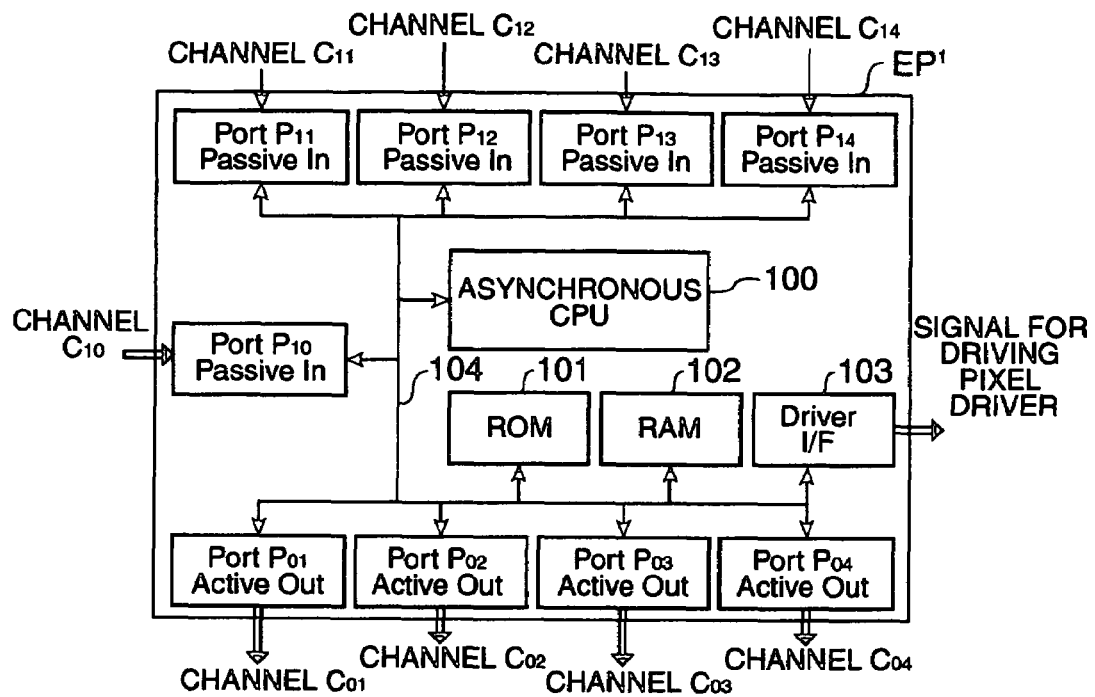
FIG. 7 is a block diagram of an element processor according to a second embodiment of the invention.

FIG. 7 is a block diagram illustrating the first element processor according to the second embodiment. As shown in FIG. 7, the first element processor EP1 is configured so that an asynchronous CPU 100, a ROM 101, a RAM 102, a driver interface circuit 103, an input port PI0, input ports PI1 through PI4, and output ports PO1 through PO4 are interconnected with an internal bus 104.

The asynchronous CPU 100 is main calculation means of the element processor. The CPU 100 includes a configuration of an event-driven asynchronous circuit so that software programs stored in the ROM 101 can be sequentially executed. In the ROM 101, software program data for operating the asynchronous CPU 100. Particularly in the embodiment, data is stored that is obtained by converting description language written in a reversed polish notation to machine language by a complier. The RAM 102 is used as an operating region for the asynchronous CPU 100.

The driver interface circuit 103 supplies pixel data having a changed grayscale to the pixel driver GD. In a case where the pixel driver GD is configured as an analog current amplifying circuit, the circuit 103 can output pulse width modulation (PWM) output or modulate a current. This allows pixel data changed in a predetermined grayscale to be output as a signal having a current (power) value corresponding to the grayscale.

The input port PI0 is a passive input port that receives pixel data X supplied from corresponding second element processor EP2 via a channel CI0. Each of the input ports PI1 through PI14 is a passive input port that receives error data from the corresponding first element processor EP1 adjacent to each of input ports PI1 through PI4 via each of channels CI1 through CI4. Each of the output ports PO1 through PO4 is an active output port that outputs error data generated by the error diffusion calculation by the first element processor EP1 to corresponding adjacent first element processor EP1 via each of the channels CO1 through CO4.

Figure 8:
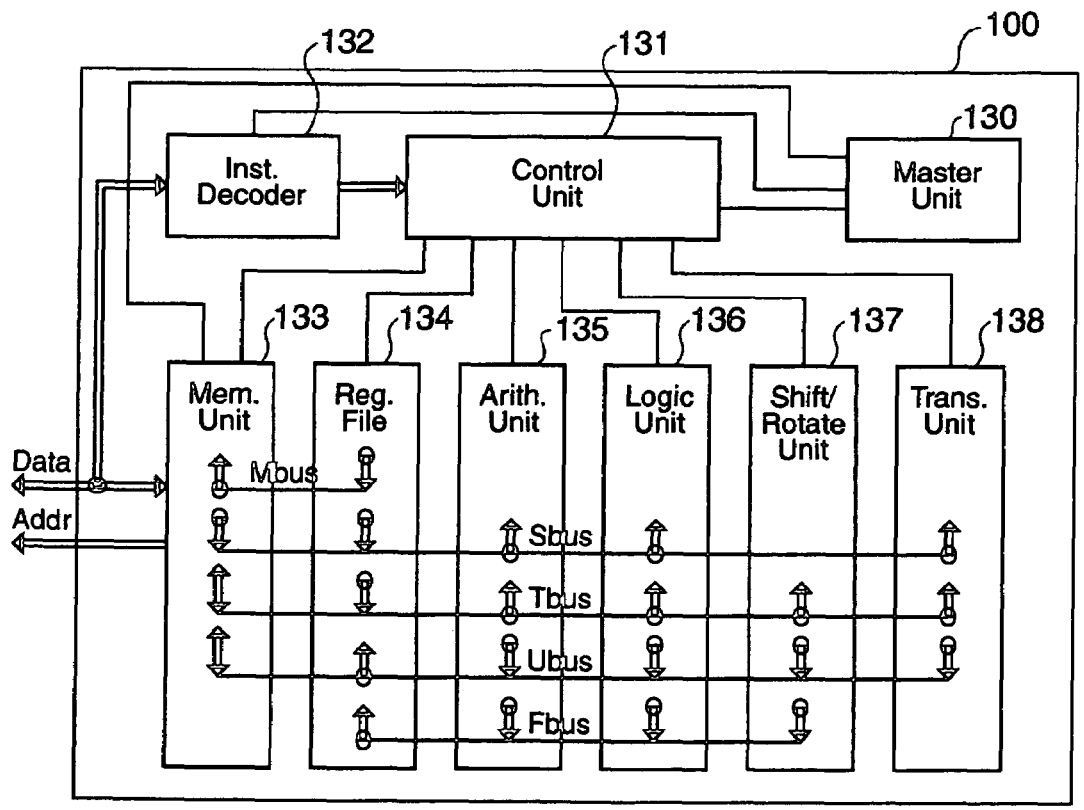
FIG. 8 is a block diagram of an asynchronous CPU according to the second embodiment of the invention.

FIG. 8 is a detailed equivalent block diagram of the asynchronous CPU 100. As shown in FIG. 8, the asynchronous CPU 100 is configured by including a master unit 130, a control unit 131, an instruction decoder 132, a memory unit 133, a register file 134, an arithmetic unit 135, a logic arithmetic unit 136, a shift/rotate unit 137, a transfer unit 138, and a data bus interconnected between the units.

The master unit 130 is configured so as to control the control unit 131, the instruction decoder 132, and the memory unit 133. The control unit 131 controls the memory unit 133, the register file 134, the control unit 131, the arithmetic unit 135, the logic arithmetic unit 136, the shift/rotate unit 137, and the transfer unit 138 by an instruction from the master unit 130. The instruction decoder 132 decodes an instruction read from the ROM 101 based on an instruction from the master unit 130. The memory unit 133 accesses the RAM 102 or the ROM 101 based on an instruction from the master unit 130 and the control unit 131. The register file 134 is configured with various registers only for calculation such as program counters or status registers, and various general-purpose registers. The arithmetic unit 135 executes a calculation process instructed by a program using each of exclusive registers or general-purpose registers in the register file 134 as an accumulator. The logic arithmetic unit 136 executes a logic calculation instructed by a program. The shift/rotate unit 137 performs shift operation with or without a carry bit, or bit operation if a data rotation is instructed. The transfer unit 138 interchanges contents between registers or higher-order bits and lower-order bits of data stored in the registers.

Now, various buses will be described. A bus M is a bus for sending an address to the memory unit 133 from program counters, etc., in the register file 134. A bus S is purposed for sending source data to the arithmetic unit 135 and/or the logic arithmetic unit 136 and/or the shift/rotate unit 137 and/or the transfer unit 138 from the memory unit 133 and the register file 134. A bus T is purposed not only for sending source data to the arithmetic 135 and/or the logic arithmetic 136 and/or the shift/rotate unit 137 and/or the transfer unit 138 from the memory unit 133 and the register file 134, but also for transferring contents of a register to another register or the memory unit 133. A bus U is purposed not only for sending a result of a calculation and bit operation from the arithmetic unit 135, the logic arithmetic unit 136, the shift/rotate unit 137, and the transfer unit 138 to the register file 134 and the memory unit 133, but also for transferring contents in the memory unit 133 or a register to another register. A bus F is purposed for setting a result of a calculation and bit operation of the arithmetic unit 135, the logic arithmetic unit 136, and the shift/rotate unit 137 to a status register.

The asynchronous CPU 100 includes the same block configuration as that of typical microcomputer. However, the CPU 100 includes a configuration as an asynchronous circuit in which operations are asynchronously executed, does not include a configuration in which operations are executed with a global clock, i.e. reference clock. That is, the asynchronous circuit includes a configuration of an event-driven type and designed so as to asynchronously operate in response to a signal from an external. Since in such asynchronous circuit, each block is not operated by a reference clock, a circuit for synchronizing the operation of each block is required. A rendezvous circuit or an arbiter circuit plays the role. The circuit locally cooperates as a special circuit that defines the order of mutual operations so that once all data is ready after finishing operation in one block, operation for the next block starts. Specifically, the rendezvous circuit is a circuit that controls data with a pipe-line method so as to flow in an order without a clock from a central controller by rendering operation of the asynchronous CPU to cooperate. For example, Muller C element is used. The arbiter circuit is a circuit that performs an arbitration process to prioritize either one process in a case where two blocks virtually simultaneously access a block. For the asynchronous CPU, various known techniques that have been long researched can be used. For example, it is outlined in Nikkei Science, vol. 11, 2002, pp 68-76, titled as "break through the limitation with asynchronous chips," I. E. Sutherland, et al.

In the asynchronous CPU 100, for example, events between all unit registers are asynchronously operated by 4-phase or 2-phase handshaking with operation of each internal bus as a center. In addition, it is preferable that not only the asynchronous CPU 100, but also the ROM 101, the RAM 102, and input-output ports are configured so as to be operated asynchronously. Particularly, the communication between the first element processors EP1 is performed by handshaking, matching well to the operation of the asynchronous circuit in which one operation induces the next operation. As a result, the first element processor group EPG1 can be entirely configured with the asynchronous circuit.

In the above-mentioned configuration, upon applying a power source to the asynchronous CPU 100, a reset signal output from a reset signal generator (not shown) included in the master unit 130 is negated, so that operations of all of the units start. The master unit 130 firstly gives an instruction to the control unit 131, the memory unit 133, and the instruction decoder 132 so as to fetch an instruction read from a predetermined address in the ROM 101. That is, the memory unit 133 firstly outputs an address to an address bus, and then inputs an instruction from the RAM 102 or the ROM 101 via data bus. Subsequently, the instruction decoder 132 decodes the fetched instruction, outputting a result to the control unit 131. The control unit 131 controls various units designated by a decoded result from the instruction decoder 132 in accordance with a control from the master unit 130, completing an execution of the fetched instruction. A result of the executed instruction is stored in various registers in the register file 134 when needed, and also stored in the RAM 102 via the memory unit 133.

The asynchronous CPU 100 executes a corresponding calculation and input-output process by fetching an instruction from the ROM 101 in sequence with such operations, rendering the first element processor EP1 to execute the error diffusion calculation described in the first embodiment.

Here, the machine language including instructions stored in the ROM 101 is obtained by compiling a program written in Forth language. The Forth language has high sequential execution property since it is written so that an operator is written after an operand such as variables or numerical values, etc. Thus, a calculation is determined by a relation between an operator and an operand just before the operator, preventing a stack from nesting deep. Therefore, it is suitable for a small system that executes a relatively simple calculation at high speed. It is indeed suitable as a description language for a processor that sequentially executes fixed calculations at high speed such as the first element processor EP1.

Programming language for the asynchronous CPU 100 is not limited, but can be changed in accordance with processing ability of the asynchronous CPU 100. In addition, the asynchronous circuits can be formed on a substrate with the pixel elements and the pixel drivers, the circuits being composed of a TFT made of LTPS, HTPS, amorphous silicon, etc., and an organic TFT as a basic element.

As above-mentioned, according to the second embodiment, in addition to the same effects as those of the first embodiment, power consumption can be reduced extremely low. Because the first element processor is configured with the asynchronous CPU, resulting to no power consumption in an inactive unit. Accordingly, even though a number of element processors are used, power consumption is suppressed and heating value is reduced. In addition, waiting time for synchronizing a clock is not required. This allows an operation speed to be increased to a physical limit of the element regulated by its switching speed.

Third Embodiment

A third embodiment according to the invention relates to an electro-optical device correcting relatively large discontinuity in a hue and a density, the continuity being able to occur in a case where a large display area is made. In an electro-optical device having a large-sized screen, e.g. an image display device hung on a wall, since the whole display surface cannot be formed with one substrate, pixel elements and pixel drivers are formed on several divided tiles so that the whole display surface is formed by combining the divided tiles. In this case, a case arises in which pixels are not displayed with the visually same density and luminance even though the same pixel data is supplied to adjacent tiles due to a variation between tiles caused by manufacturing time or manufacturing conditions. If the variation occurs in each pixel corresponding to 3 primary colors, it causes a difference between color pixels in their hues, saturation, and brightness. In the third embodiment, means is provided for compensating such visual discontinuity in density. Hereinafter, density is defined by including not only a color density of single color, but also a hue, saturation, and brightness from a color pixel point of view.

Figure 9:
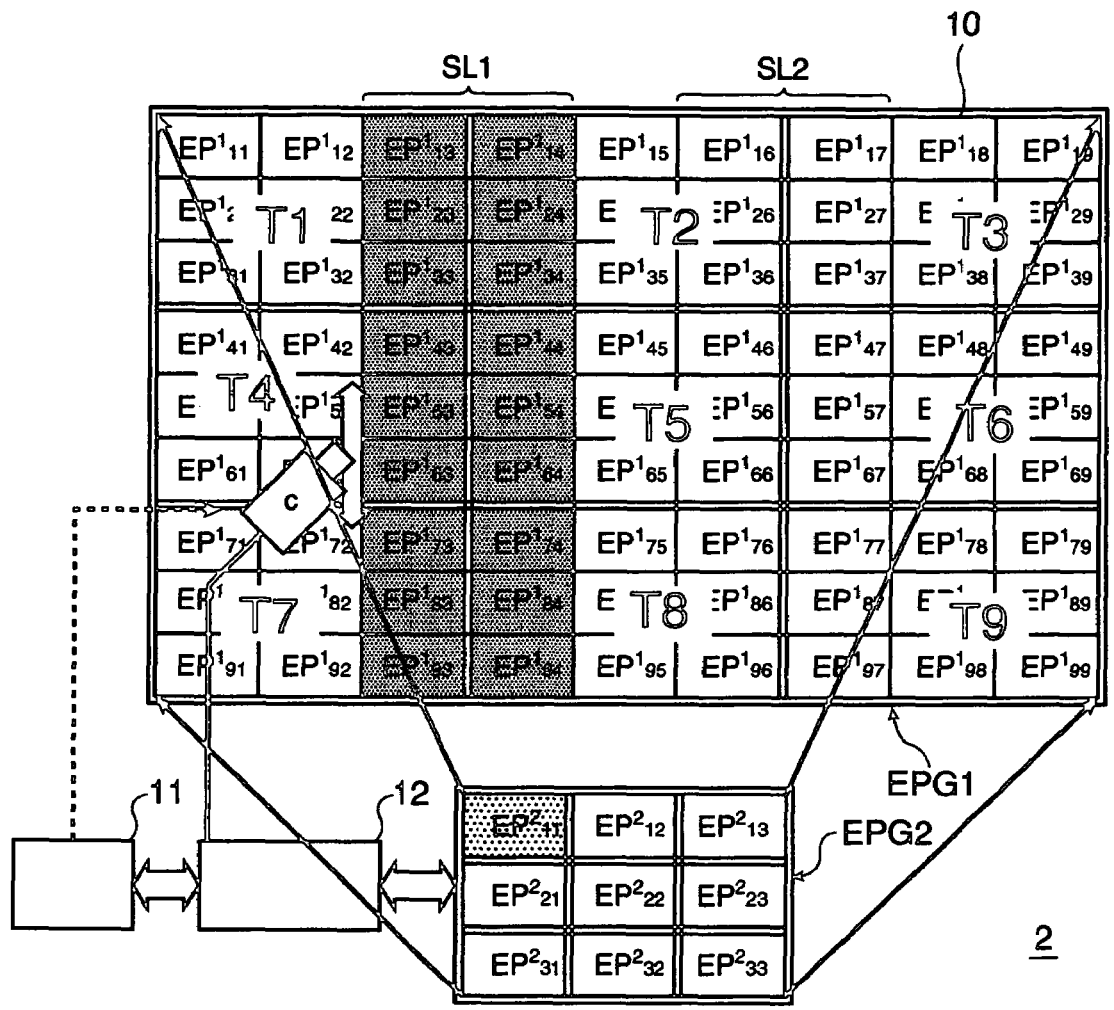
FIG. 9 is a diagram illustrating a configuration and effect of an error compensation device according to a third embodiment of the invention.

FIG. 9 illustrates a configuration of the electro-optical device according to the third embodiment. As shown in FIG. 9, an electro-optical device 2 according to the third embodiment includes a camera C, a transfer device 11, and a density error compensation circuit 12, in addition to the first element processor group EPG1, the second element processor group EPG2, and the third element processor EP3 that are the same as those in the first embodiment. The first element processor group EPG1 is constructed as follows: one tile T is divided and formed with pixel elements in 3 rows×3 columns; and then the tiles are jointed. That is, the display surface 10 is entirely constructed with 9 tiles T1 through T9 as shown in FIG. 9.

The camera C is a density measurement device of the invention. As a measurement device, the camera C measures a density (luminance) of a color displayed on a predetermined measurement region, outputting a density signal corresponding to the density. The transfer device 11 is constructed with a stepping motor, a belt, and a pulley, etc. that are not shown. This allows the camera C to be fixed and to be moved to any position in response to a control of the density error compensation circuit 12. The density error compensation circuit 12 is configured so that it measures a density in each adjacent measurement region with reference to a density signal detected by the camera C and can supply density error data corresponding to a density difference between the adjacent measurement regions to the second element processor EP2 serving as an element processor. The density error compensation circuit 12 has a configuration as a computer device including a memory in addition to an image processing function. This allows a value corresponding to a density signal from the camera C to be stored in accordance with a measurement region so as to be able to execute a predetermined calculation. In the above-mentioned construction, the transfer device 11 is optional. For example, the camera C serving as the measuring instrument may be preliminarily and fixedly positioned to measure at a boundary region between tiles at which discontinuity in a density possibly occurs.

Effects in the above-mentioned configuration will be described. The above-mentioned discontinuity in density occurs at boundary region between tiles. That is, a density differs between the pixels each of which is displayed by the pixel element GE arranged at an end of each of adjacent tiles. Therefore, in the embodiment, the camera C is transferred along a boundary between tiles so as to detect a displayed density of the pixel element GE at the end of tile or a predetermined measurement region. The measurement region for a measuring unit larger than the pixel element is chosen by a unit of a color tile for display or color bar. It is intended to reduce differences in brightness, hues, and saturation at a boundary region between tiles to a level lower than a sensory limitation. Thus, it is assumed that brightness, a hue, and saturation are not different between pixel elements in the same color tile.

As shown in FIG. 9, the transfer device 11 firstly transfers the camera C along a boundary region SL1 for detecting a density in measurement regions between T1 and T2, T4 and T5, and T7 and T8. Synchronizing with the movement, the camera C detects a displayed density in a pixel displayed by a pixel element GE arranged at two tiles in a lateral direction included in the boundary region SL1 so as to output as a density signal. Synchronizing with the movement of the transfer device 11, the density error compensation circuit 12 specifies a measurement region or a pixel element GE in measuring, storing a relative value of a density signal in accordance with the measurement region or the pixel element GE. For example, a density with respect to a pixel element $GE_{13}$ is stored as $C_{13}$, while a density with respect to a pixel element $GE_{14}$ is stored as $C_{14}$. Generally, a density with respect to a pixel element $GE_{MN}$ is stored as $C_{MN}$, while a density with respect to a pixel element $GE_{M(N+1)}$ is stored as $CM_{(N+1)}$. In a case where a predetermined measurement region is chosen as a measuring unit, a relative value of a density signal is stored every measurement region.

Next, the density error compensation circuit 12 calculates a density difference ΔC between adjacent measurement regions or pixel elements, for example, between $GE_{13}$ and $GE_{14}$. Here, if a difference between pixel data Y having a changed grayscale that are calculated for each pixel element directly corresponds to the density difference ΔC, a variation in displayed density between tiles would not be present. In contrast, a difference between pixel data having a changed grayscale does not correspond to a density difference ΔC, a variation would occur in which a density is displayed different in every tile.

Therefore, the density error compensation circuit 12 compares a density difference ΔC and a difference ΔY between pixel data Y supplied to pixel element to be compared with a preliminarily determined coefficient k (Y=ΔY−k·ΔC) that defines a corresponding relation between pixel data Y and density C. For example, the following calculation is carried out with respect to the pixel elements $GE_{MN}$ and $GE_{M(N+1)}$.

$$\Delta P = \Delta Y - k \cdot \Delta C \text{ where } \Delta Y = (Y_{MN} - Y_{M(N+1)}), \Delta C = (C_{MN} - C_{M(N+1)})$$

ΔP is added to the second element processor EP2 corresponding to a specific pixel element as a compensation coefficient of the pixel data $X_{M(N+1)}$ with respect to the specific pixel element. This process reduces density differences caused by display characteristic of tiles. Once finishing a measurement and density compensation of the boundary region SL1, a measurement and density compensation for another boundary region SL2 are performed.

Figure 10:
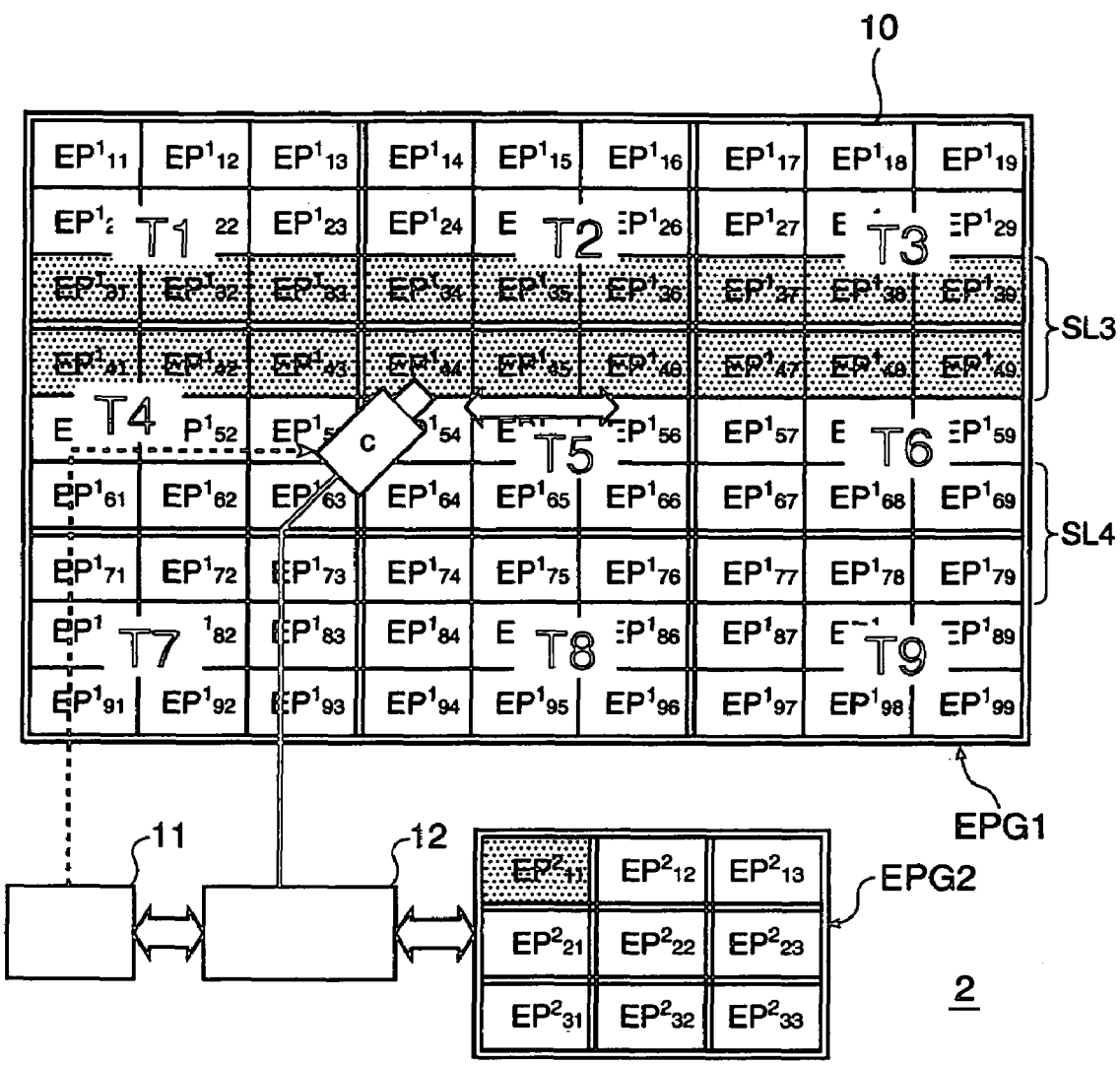
FIG. 10 is a diagram illustrating a configuration and effect of an error compensation device according to the third embodiment of the invention.

As shown in FIG. 10, upon completion of measuring boundary lines in the longitudinal direction, the transfer device 11 transfers the camera C along a boundary line in the lateral direction so as to detect a variation between tiles arranged in the longitudinal direction. For example, as shown in FIG. 10, the transfer device 11 transfers the camera C along a boundary region SL3 to detect a density in a measurement region or between pixel elements at the boundaries between tiles T1 and T2, T2 and T5, and T3 and T6. Synchronizing with the movement, the camera C detects a density displayed in a measurement region or the pixel element GE of two tiles in the lateral direction that are included in the boundary region SL3 so as to output as a density signal. Similarly as above-mentioned, synchronizing with the movement of the transfer device 11, the density error compensation circuit 12 specifies a measurement region or a pixel element GE in measuring, storing a relative value of a density signal in accordance with the measurement region or the pixel element GE, and then executing a density compensation calculation with reference to image data Y having a changed grayscale. Upon completion of the above-mentioned processes, the circuit 12 also inspects a boundary region SL4 and executes a density compensation calculation.

In the above-mentioned calculation, a compensation element is added to image data X for a quantization calculation. However, a configuration may be employed in which image data Y having a changed grayscale is changed. Moreover, a configuration may be employed in which a displayed density is compensated by directly controlling control elements such as current amplifying rate of the pixel driver GD.

As above-mentioned, the third embodiment has the following advantages. Even if a variation occurs in a displayed density between tiles, the density error compensation circuit reads a density difference taken place in a predetermined measurement region or between pixel elements so as to generate a density compensation data corresponding to the error in the density. The element processor executes a compensation calculation so as to eliminate a density error supported by the density error data. As a result, the density difference (difference in hues, saturation, and brightness) can be visually reduced. In other words, even in a case where a density difference occurs in an actual display due to a variation between tiles, according to the configuration, a calculation is executed based on the density difference on the actual display. As a result, the visual density difference can be reduced. Therefore, in a case where an electro-optical device having a large-sized screen or display structure is constructed with a plurality of tiles or substrates, etc., a display density difference due to variations is not required to take it into consideration. This allows the electro-optical devices to be easily manufactured, while the electro-optical device having a large-sized screen displaying in a uniformed density to be easily constructed.

Fourth Embodiment

Figure 11A:
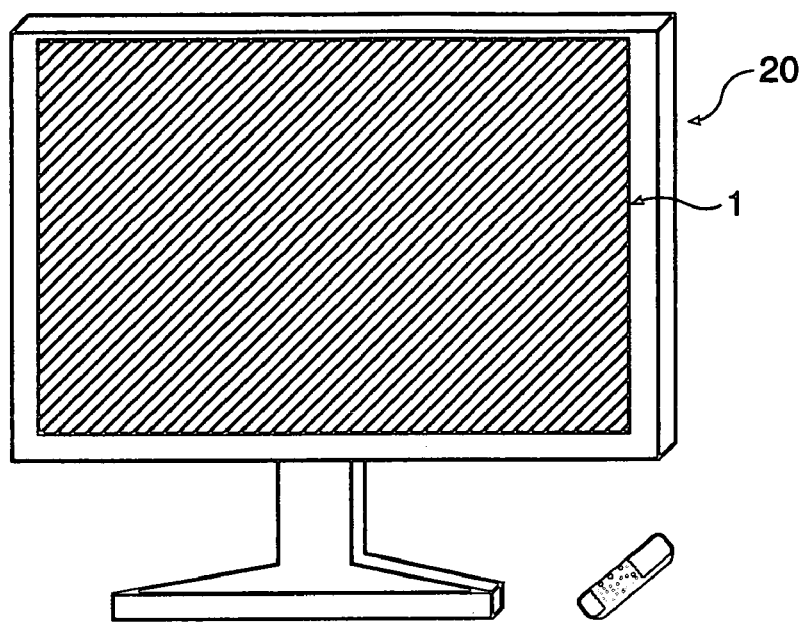
FIG. 11A illustrates a whole diagram of a flat panel display as an example of electronic devices.
Figure 11B:
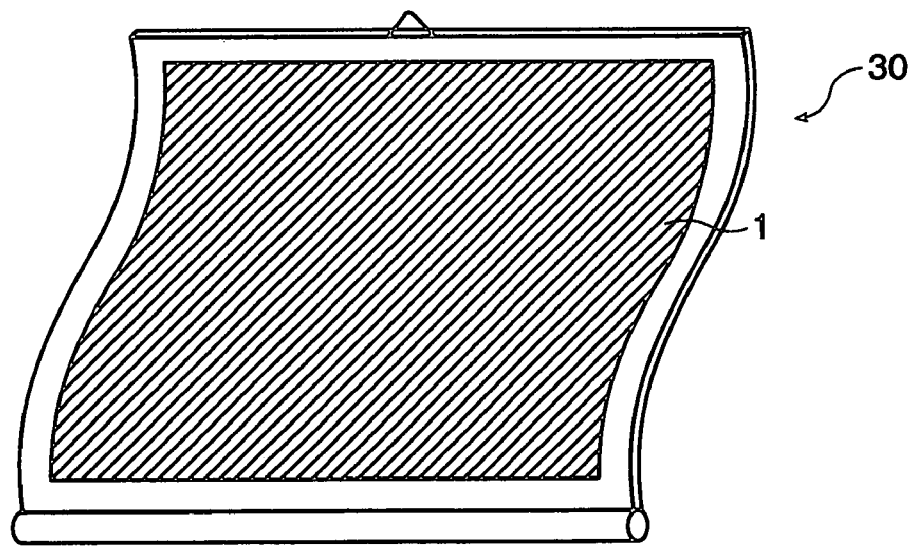
FIG. 11B illustrates a whole diagram of a roll-up type display as another example of electronic devices.

A fourth embodiment according to the invention relates to applied products equipped with the electro-optical device of the invention. The invention can be applied to not only electronic-devices equipped with the electro-optical device as a display but also display structures into which the electro-optical device is built. FIG. 11A and FIG. 11B illustrate examples of electronic device to which the electro-optical device 1 is applied. FIG. 11A illustrates a flat display device as an applied example. The electro-optical device 1 according to the invention is built in a television device body 30 including a tuner, an amplifier, and an image processing device that are not shown. FIG. 11B illustrates a roll-up television device as another applied example. The electro-optical device 1 according to the invention is formed on a flexible substrate so as to be freely drawn from a chassis. For such image display device having a large-sized screen, the electro-optical device of the invention is suitable.

Figure 12:
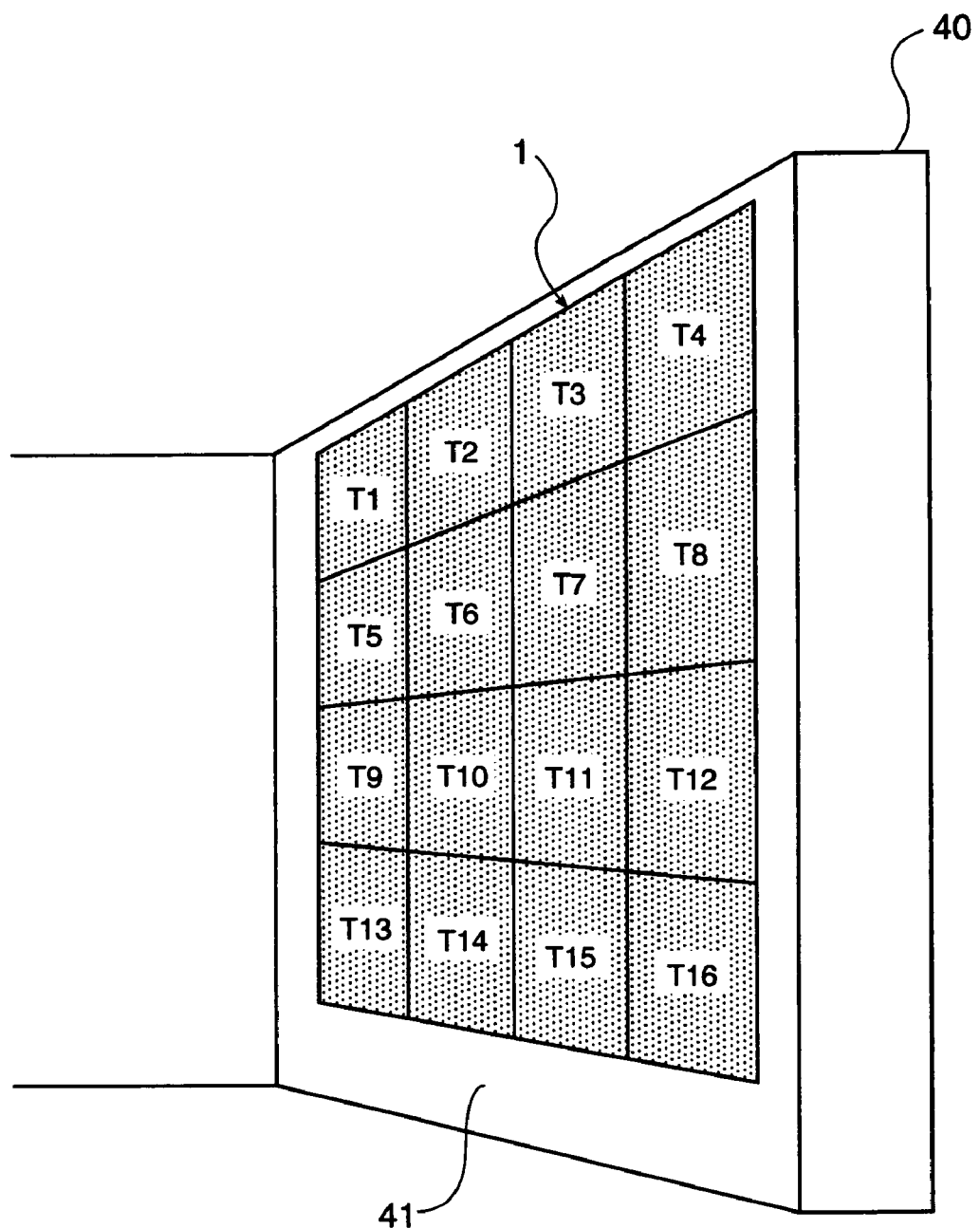
FIG. 12 is a conceptual diagram illustrating the electro-optical device of the invention built in a wall as an example of display structure.

FIG. 12 illustrates a display structure as an applied example of the electro-optical device 1. As shown in FIG. 12, the electro-optical device 1 of the invention is built in a wall surface 41 of a wall structure 40 that is constructed. The display surface of the electro-optical device 1 is made by combining a total of 16 tiles of T1 through T16. A variation in color density displayed in each of tiles T1 through T16 is compensated by, for example, the density error compensation circuit in the third embodiment.

In addition to the above-mentioned, the electro-optical device of the invention can be applied to devices that require a display surface such as personal computers, cellular phones, video cameras, head mount displays, rear or front projectors, fax-machines with display functions, finders in digital cameras, portable TVs, DSP devices, PDAs, electronic-note-books, electric sign boards, IC cards, advertising displays, etc. Particularly, since the invention allows a display in a large-sized screen to be presented with high definition and high color reproducibility, it can be used for HDTVs having an ultra large-sized screen, display devices for conference system, display devices for air traffic control, display devices for traffic control, home theaters, display devices for movies, etc.

The electro-optical device of the invention can be manufactured by building into a wall surface of mobile objects such as vehicles, trains, air planes, etc., in addition to architectural structures such as walls, flowers, ceilings, etc. Particularly, the invention allows images to be displayed with natural definition and color reproducibility even though the image is observed close to the display surface, it is preferably applied to image display structures attached on a wall surface of a passage way not so wide, and also to displays in which displays each having a different definition and supplied from a different image source are displayed in the same display surface.

Other Possible Modifications

The invention is not limited to the above-mentioned embodiments, but can be applied with various modifications.

1) For example, in the first embodiment, the element processors are configured in 3 layers, but not limited to this. Pixel data may be directly supplied to the first element processor group EPG1 from the main processor M so as to execute a quantization by error diffusion. In this case, by providing a terminal for supplying the pixel data to each first element processor EP1, the display surface 10 is individually configured. Such configuration makes it possible to provide structures that display images by connecting a device supplying pixel data when needed, and are used as a merely wall when images are not required to be displayed.

2) A configuration may be employed in which an algorithm for quantization calculation can be changed by allowing programming data to be supplied to each first element processor EP1. For example, a calculation method for quantization can be changed from the two-dimensional error diffusion method to another calculation method, e.g. a minimized average error method. The number of grayscale of pixel data Y that is finally output also can be changed. The configuration in which programs can be changed makes it possible to achieve a suitable grayscale in response to an object to be displayed.

3) A role played by the element processor in a higher-layer is to reduce traffic (distributed information amount). A configuration may be employed in which topology can be dynamically changed in the higher-layer. That is, as compared with the way in which physical pixel space data is transferred in the first layer and the last half of the second layer, a better transferring efficiency is obtained by the way in which pixel data or vector data or data encoded in MPEG format is transferred to the Z-axis direction while transferring in the X-axis and the Y-axis directions in the higher-layer, i.e. transferred between layers. In the layer structure of element processor, the structure being hierarchically constructed with a plurality of layers, a moving distance taken by moving near the top of the pyramid of layer structure is shorter than that taken by moving near lower-layer. In addition, a topology can be configured that has a pyramid structure configured with a plurality of layers having the same base in common. Further, not only a fixed topology but also a configurable topology can be configured. Since an asynchronous design based on a synchronous circuit includes no fixed timing design, it is suitable for a design method for configuring such hierarchical topology.

What is claimed is:

1. An electro-optical device, comprising:
   a matrix of pixel elements;
   a matrix of pixel drivers, each of which corresponds to one of the pixel elements; and
   a matrix of element processors, each of which corresponds to one of the pixel drivers executing grayscale calculation for transforming the grayscale resolution of the pixel data into another grayscale resolution, which is intrinsic in the couple of the pixel element and the driver, with reference to error distributed from the adjacent element processors in order to supply the result of the calculation to the corresponding pixel driver, and also to distribute the error of the grayscale calculation to the adjacent pixel element processors,
   superior layers of a matrix of element processors providing the element processors with pixel data, which is fed to each of the element processors of the matrix, and
   element processors on an edge of the matrix using constant values in substitute for error distributed from the adjacent processors.

2. The electro-optical device according to claim 1, each element processor being implemented as an asynchronous circuit without clocking and being connected to the adjacent element processors by using a handshaking protocol.

3. The electro-optical device according to claim 2, each element processor being configured to be able to evaluate complex expression written in reverse polish notation (RPN).

4. The electro-optical device according to claim 1 further comprising:
   a color measuring system that consists of a color measuring means and a control circuit for feeding back error in color space to the element processors that is connected to the element drivers.

5. The electro-optical device according to claim 4 further comprising a locating means for locating the color measuring means on arbitrary position in the matrix of pixels.

6. An electronic device comprising the electro-optical device according to claim 1.

7. A display structure into which the electro-optical device according to claim 1.

8. An electro-optical device, comprising:
   a matrix of pixel elements;
   a matrix of pixel drivers, each of which corresponds to one of the pixel elements;
   a first layer of a matrix of the element processors, each of which corresponds to one of the pixel driver executing grayscale calculation for transforming the grayscale resolution of the pixel data into another grayscale resolution, which is intrinsic in the couple of the pixel element and the driver, with reference to error distributed from the adjacent element processors in order to supply the result of the calculation to the corresponding pixel driver, and also to distribute the error of the grayscale calculation to the adjacent pixel element processors; and
   a second layer of a matrix of element processors, each of which is mapped to either one or more element processors of the first layer matrix, providing the element processors of the first layer matrix with pixel data, element processors on the edge of the first layer matrix using constant values in substitute for error distributed from the adjacent processors.

9. The electro-optical device according to claim 8, each element processor of the second layer matrix being mapped to either one or more element processors in the first layer matrix and collaborating in transforming the source image data in logical space into the pixel data in physical space that is supplied to the first element processors.

10. The electro-optical device according to claim 9, element processors of the second layer matrix collaborating in performing operations of interpolation and extrapolation upon the pixel data in logical space to generate the pixel data in physical space.

* * * * *